United States Patent
Katayama et al.

(10) Patent No.: US 9,696,538 B2
(45) Date of Patent: Jul. 4, 2017

(54) OPTICAL INTERCONNECT DEVICE, INFORMATION PROCESSING DEVICE AND DATA TRANSMISSION METHOD

(71) Applicant: International Business Machines Corporation, Armonk, NY (US)

(72) Inventors: Yasunao Katayama, Tokyo (JP); Naoya Kuse, Osaka-fu (JP); Daiju Nakano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 14/561,606

(22) Filed: Dec. 5, 2014

(65) Prior Publication Data

US 2015/0180572 A1 Jun. 25, 2015

(30) Foreign Application Priority Data

Dec. 19, 2013 (JP) ................................ 2013-262868

(51) Int. Cl.
*H04J 14/00* (2006.01)
*G02B 26/08* (2006.01)
(Continued)

(52) U.S. Cl.
CPC ....... *G02B 26/0816* (2013.01); *G02B 6/4214* (2013.01); *H04B 10/11* (2013.01);
(Continued)

(58) Field of Classification Search
CPC ............................ H04B 10/11–10/116; H04Q 11/0001–11/0005;
(Continued)

(56) References Cited

U.S. PATENT DOCUMENTS 5,078,499 A * 1/1992 LaMarche ............ G02B 27/123
359/19
5,594,580 A * 1/1997 Sakanaka ........... H04B 10/1125
398/122

(Continued)

FOREIGN PATENT DOCUMENTS

JP 07098463 A 4/1995
JP 10227915 A 8/1998

(Continued)

OTHER PUBLICATIONS

Wang et al: "Experimental Demonstration of High-Speed Reconfigurable Card-to-Card Optical Interconnects with Broadcast Capability", IEEE Optical Interconnects Conference, May 5-8, 2013, pp. 78-79.*

(Continued)

*Primary Examiner* — Li Liu
(74) *Attorney, Agent, or Firm* — Bryan D. Wells; Daniel R. Simek

(57) ABSTRACT

To provide a high-density optical interconnect device, information processing device and data transmission method which are able to suppress limitations caused by the widening of light beams and the size of lenses. An optical interconnect unit includes a plurality of first lenses and a plurality of second lenses corresponding to a plurality of light-emitting element groups, and a plurality of light beams emitted from the plurality of light-emitting element groups pass through plurality of first lenses and the plurality of second lenses. The optical interconnect unit also includes a plurality of third lenses and a plurality of fourth lenses, and light beam groups pass through any one of the plurality of third lenses and the plurality of fourth lenses, and are focused by any one of a plurality of light-receiving element groups that include a plurality of light-receiving elements.

19 Claims, 11 Drawing Sheets

(51) Int. Cl.
H04B 10/11 (2013.01)
H04Q 11/00 (2006.01)
G02B 6/42 (2006.01)
H04B 10/80 (2013.01)

(52) U.S. Cl.
CPC ....... H04B 10/803 (2013.01); H04Q 11/0005 (2013.01); *H04Q 2011/003* (2013.01); *H04Q 2011/0024* (2013.01); *H04Q 2011/0026* (2013.01)

(58) Field of Classification Search
CPC ................ H04Q 2011/0024–2011/003; H04Q 2011/0052–2011/006
USPC ..................................... 398/45–57, 118–131
See application file for complete search history.

(56) References Cited

U.S. PATENT DOCUMENTS

| | | | | |
|---|---|---|---|---|
| 5,627,669 | A * | 5/1997 | Orino | H04B 10/118 398/129 |
| 5,684,614 | A * | 11/1997 | Degura | H04B 10/1121 398/131 |
| 5,781,671 | A * | 7/1998 | Li | H04B 10/803 372/50.1 |
| 5,857,042 | A * | 1/1999 | Robertson | G02B 6/4249 359/455 |
| 6,335,811 | B1 * | 1/2002 | Sakanaka | H04B 10/11 398/129 |
| 6,339,506 | B1 * | 1/2002 | Wakelin | G02B 27/0025 359/626 |
| 6,456,751 | B1 * | 9/2002 | Bowers | G02B 6/3588 385/16 |
| 6,529,299 | B1 * | 3/2003 | McConnell | G02B 6/3518 398/58 |
| 6,587,611 | B1 * | 7/2003 | Hunt | G02B 6/359 385/16 |
| 7,127,136 | B2 * | 10/2006 | Hall | H04Q 11/0005 385/16 |
| 7,155,129 | B2 * | 12/2006 | Bringans | H04B 10/801 359/814 |
| 7,873,280 | B2 | 1/2011 | Haney et al. | |
| 2002/0093723 | A1 * | 7/2002 | Okayama | G02B 6/32 359/320 |
| 2004/0207926 | A1 * | 10/2004 | Buckman | H04B 10/801 359/642 |
| 2005/0047711 | A1 * | 3/2005 | Ide | G02B 6/3588 385/18 |
| 2005/0254747 | A1 * | 11/2005 | Bowers | G02B 6/352 385/18 |
| 2005/0286891 | A1 * | 12/2005 | Sakai | G02B 6/3588 398/45 |
| 2006/0193634 | A1 * | 8/2006 | Wang | H04B 10/1141 398/118 |
| 2010/0134874 | A1 * | 6/2010 | Ozeki | G02B 6/4206 359/328 |
| 2013/0170838 | A1 * | 7/2013 | Tsuchiya | H04J 3/1652 398/98 |
| 2014/0043701 | A1 * | 2/2014 | Motomura | G02B 7/028 359/811 |
| 2014/0110570 | A1 * | 4/2014 | Morioka | G02B 6/4286 250/216 |
| 2014/0161466 | A1 * | 6/2014 | Riza | H04B 10/1143 398/119 |

FOREIGN PATENT DOCUMENTS

| | | |
|---|---|---|
| JP | 2002353494 A | 12/2002 |
| JP | 2010191365 A | 9/2010 |
| JP | 2011520381 A | 7/2011 |
| JP | 2012141471 A | 7/2012 |
| JP | 2012255932 A | 11/2012 |
| WO | 2008023583 | 2/2008 |

OTHER PUBLICATIONS

Kirk et al: "Design Rules for Highly Parallel Free-Space Optical Interconnects", IEEE Journal of Selected Topics in Quantum Electronics, vol. 9, No. 2, Mar./Apr. 2003, pp. 531-547.*

Li et al: "Three-dimensional optoelectronic stacked processor by use of free-space optical interconnection and three-dimensional VLSI chip stacks", Applied Optics, vol. 41, No. 2, Jan. 10, 2002, pp. 348-360.*

Katayama et al., "Software-Defined Massive Multicore Networking via Freespace Optical Interconnect", CF'13, May 14-16, 2013, Ischia, Italy, Copyright 2013 ACM.

Katayama et al., "Optical Interconnect Device, Information Processing Device and Data Transmission Method", Japan Patent application 2013-262868, (English Translation), JP920130133JP1, Filed Dec. 19, 2013.

Kirk et al. "Design Rules for Highly Parallel Free-Space Optical Interconnects", IEEE Journal of Selected Topics in Quantum Electronics, vol. 9, No. 2, Mar./Apr. 2003, pp. 531-547, © 2003 IEEE, <http://ieeexplore.ieee.org/stamp/stamp.jsp?tp=&arnumber=1239020>.

Wang et al. "Experimental Demonstration of High-Speed Reconfigurable Card-to-Card Optical Interconnects with Broadcast Capability", pp. 78-79, © 2013 IEEE <http://ieeexplore.ieee.org/stamp/stamp.jsp?arnumber=6552937>.

* cited by examiner

OPTICAL INTERCONNECT DEVICE, INFORMATION PROCESSING DEVICE AND DATA TRANSMISSION METHOD

CROSS-REFERENCE TO RELATED APPLICATION

This application claims the benefit of priority under 35 U.S.C. 119 from Application No. 2013-262868, filed on Dec. 19, 2013 in Japan.

BACKGROUND OF THE INVENTION

The present invention relates to an optical interconnect device, information processing device and data transmission method.

The performance of information processing devices such as computers has improved considerably. For example, communication speeds have increased, power consumption has fallen, and the transmission of information has become more reliable. However, while the performance of devices such as transistors is reaching it limit, device-to-device connection techniques (e.g., interconnect techniques) have become a key to further improvements in the performance of information processing devices. Methods in which wiring is provided two-dimensionally require a large number of complicated wiring patterns which are not conducive to improving transmission speeds.

The free-space optical interconnect technique has been proposed for propagating light through free space to transmit information. In the optical interconnect technique, information is transmitted via light using light-emitting elements (e.g., lasers) as electric-to-optic conversion devices, and light-receiving elements (e.g., photo detectors) as optic-to-electric conversion devices. A mirror is provided in the optical transmission path to switch the combination of light-emitting elements and light-receiving elements, and reconfigure the optical transmission path.

Patent Document 1 describes an optical interconnection system including a light-emitting element array, a light-receiving element array, an optical element array for adding an optical effect to light traveling from the light-emitting element array to the light-receiving element array, and a positioning mechanism connected to two-dimensional array light-receiving elements, two-dimensional array light-receiving elements or a microlens array. In the positioning mechanism, a control mechanism automatically controls the operation of a drive mechanism and a securing mechanism on the basis of information indicating the adjustment position according to an analysis of signal strength obtained from a light-receiving element.

Patent Literature 2 describes an optical module in which light from each light-emitting element in a plurality of rows incident on the first lens surface of a first lens member in a plurality of rows is totally reflected on a first inclined surface, the reflected light is spectrally dispersed by reflection/transmission layers towards a third inclined surface and a third lens surface in a plurality of rows, the light from the light-emitting elements in each transmissive row on the third inclined surface side is emitted towards the end surface of a light transmitting body by the second lens surface in a plurality of rows, and the monitor light from each light-emitting element in each reflective row on the third inclined surface side is emitted towards the light-receiving elements in a plurality of rows by a third lens surface in each row.

Patent Literature 3 describes a free-space optical interconnect device including: a first lens for collimating a light beam from a light source; a first steering element for steering the light beam from the first lens towards a predetermined location on a curved reflecting surface; a second steering element for steering the light beam reflected from the curved reflecting surface so as to be perpendicular to a detector; and a second lens for collecting the light beam on the detector.

Non-patent Literature 1 describes scaling and system partitioning configurations for clustered optical relays in chip-to-chip and board-to-board free-space optical interconnects, and the numerical values and results of theoretical analysis used to determine interconnect distances suitable for micro lens or macro lens systems.

CITED LITERATURE

Patent Literature

Patent Literature 1 Laid-open Patent Publication No. 2002-353494
Patent Literature 2 Laid-open Patent Publication No. 2012-255932
Patent Literature 3 U.S. Pat. No. 7,873,280

Non-Patent Literature

Non-Patent Literature 1
Andrew G. Kirk and four others, Design Rules for Highly Parallel Free-Space optical interconnects, IEEE Journal of Selected Topics in Quantum Electronics), (U.S.), 2003, Vol. 9, No. 2, pp. 531-574.

SUMMARY

However, in free-space optical interconnect techniques, there are limitations caused by the widening of light beams and the size of lenses in optical transmissions, and further densification is hindered. Embodiments of the present invention to provide a high-density optical interconnect device, information processing device and data transmission method which are able to suppress limitations caused by the widening of light beams and the size of lenses.

The present invention is an optical interconnect device including: a plurality of light-emitting element groups each having a plurality of light-emitting elements; a plurality of light-receiving element groups each having a plurality of light-receiving elements; and a plurality of focusing mechanisms each having a plurality of focusing members, the focusing mechanisms being provided in parallel to each light-emitting element group included in the plurality of light-emitting element groups to integrate the light beams from the plurality of light-emitting elements in the light-emitting element group and to focus the light on any light-receiving element group included in the plurality of light-receiving element groups. In this device, the light beam from at least one light-emitting element among the plurality of light-emitting elements included in at least any one of the plurality of light-emitting element groups is focused on two or more light-receiving elements included in the corresponding light-receiving element group.

The optical interconnect device of the present invention can also include a plurality of optical path switching mechanisms, each including an optical path switching member provided intervening in any ones between a plurality of focusing members in each of the plurality of focusing mechanisms, and each optical path switching mechanism switching an optical path in each light-emitting element group so that the light beams from a plurality of light-emitting elements included in a predetermined light-emitting element group among the plurality of light-emitting element groups are focused on a pre-selected light-emitting element group.

The optical path switching member in the plurality of optical path switching mechanisms can be a flat mirror or concave mirror whose angle can be changed.

The plurality of light-emitting element groups may include a total of m1 light-emitting elements (where m1 is an integer equal to or greater than 2), the plurality of light-receiving element groups may include a total of m2 light receiving elements (where m2 is an integer equal to or greater than 3, and m2 is greater than m1), and the light beam from one light-emitting element included in one light-emitting element group among the light-emitting element groups may be focused on two or more light-receiving elements included in any light-receiving element group among the light-receiving element groups.

The plurality of focusing members in each focusing mechanism among the plurality of focusing mechanisms may include at least four convex lenses arranged from the light-emitting element group to the light-receiving element group in the direction of the optical path.

One or both of a convex lens arranged opposite the light-emitting element group or a convex lens arranged opposite the light-receiving element group among the convex lenses in the plurality of focusing members in each focusing mechanism among the plurality of focusing mechanisms may further include a movable member able to change the position of the lens in the direction extending from the light-emitting element group to the light-receiving element group.

Viewed from another perspective, the present invention is an information processing device including: a first information processing block for generating a plurality of first data sets; a second information processing block for receiving the input of a plurality of second data sets; and an optical interconnect unit for transmitting the plurality of first data sets from the first information processing block using a light beam, and inputting the data sets to the second information processing block as the plurality of second data sets. Here, the optical interconnect unit includes: a plurality of light-emitting element groups each having a plurality of light-emitting elements; a plurality of light-receiving element groups each having a plurality of light-receiving elements; and a plurality of focusing mechanisms each having a plurality of focusing members, the focusing mechanisms being provided in parallel to each light-emitting element group included in the plurality of light-emitting element groups to integrate the light beams from the plurality of light-emitting elements in the light-emitting element group and to focus the light on any light-receiving element group included in the plurality of light-receiving element groups. In the optical interconnect unit, the light beam from at least one light-emitting element among the plurality of light-emitting elements included in at least any one of the plurality of light-emitting element groups is focused on two or more light-receiving elements included in the corresponding light-receiving element group.

In this information processing device, the plurality of light-emitting element groups may include a total of m1 light-emitting elements (where m1 is an integer equal to or greater than 2), the plurality of light-receiving element groups may include a total of m2 light receiving elements (where m2 is an integer equal to or greater than 3, and m2 is greater than m1), and the light beam from one light-emitting element included in one light-emitting element group among the light-emitting element groups may be focused on two or more light-receiving elements included in any light-receiving element group among the light-receiving element groups.

The number of first data sets output by the first information processing block may be n1 (where n1 is an integer equal to or greater than 1, and n1 is less than m1, the total number of light-emitting elements), the number of second data sets inputted to the second information processing block may be n2 (where n2 is an integer equal to or greater than 1, and n2 is less than m2, the total number of light-receiving elements), the first information processing block may include an encoder for encoding the n1 first data sets into signals supplied to m1 light-emitting elements, and the second information processing block may include a decoder for decoding signals from m2 light-receiving elements into n2 second data sets.

Viewed from yet another perspective, the present invention is a data transmission method for the information processing device described above, in which the data transmission method includes the steps of: encoding n1 first data sets (where n1 is equal to or greater than 1) into m1 signals (where m1 is equal to or greater than 2, and m1 is greater than n1) using an encoding matrix including preset correspondence relationships; switching the m1 signals into m2 signals (where m2 is equal to or greater than 3, and m2 is greater than m1) using a switching matrix including preset correspondence relationships; and decoding the m2 signals into n2 second data sets (where n2 is equal to or greater than 1, and n2 is less than m2) using a decoding matrix including preset correspondence relationships.

The present invention is able to provide a high-density optical interconnect device, information processing device and data transmission method which are able to suppress limitations caused by the widening of light beams and the size of the lenses.

BRIEF DESCRIPTION OF THE DRAWINGS

FIG. 5(b) shows an example of outlets from which the light of light-emitting elements in a light-emitting element group is emitted, FIG. 5(b) is an example of an image of the output of the light-emitting elements in the light-emitting element group which is incident on the light-receiving element group, and FIG. 5(c) shows another example of an image of the output of the light-emitting elements in the light-emitting element group which is incident on the light-receiving element group.

FIG. 7(a) shows results comparing an optical interconnect using a group configuration to an optical interconnect not using a group configuration.

In FIG. 8(a), the distance between the second lens and the third lens is 16 mm. In FIG. 8(b), the distance between the second lens and the third lens is 20 mm. In FIG. 8(c), the distance between the second lens and the third lens is 20 mm, and the positions of the first lens and the fourth lens have been changed.

FIG. 9(a) shows a grid-like arrangement, FIG. 9(b) shows a radial arrangement, and FIG. 9(c) shows a hexagonal arrangement.

DETAILED DESCRIPTION

The following is a detailed explanation of embodiments of the present invention with reference to the appended drawings.

Figure 1:
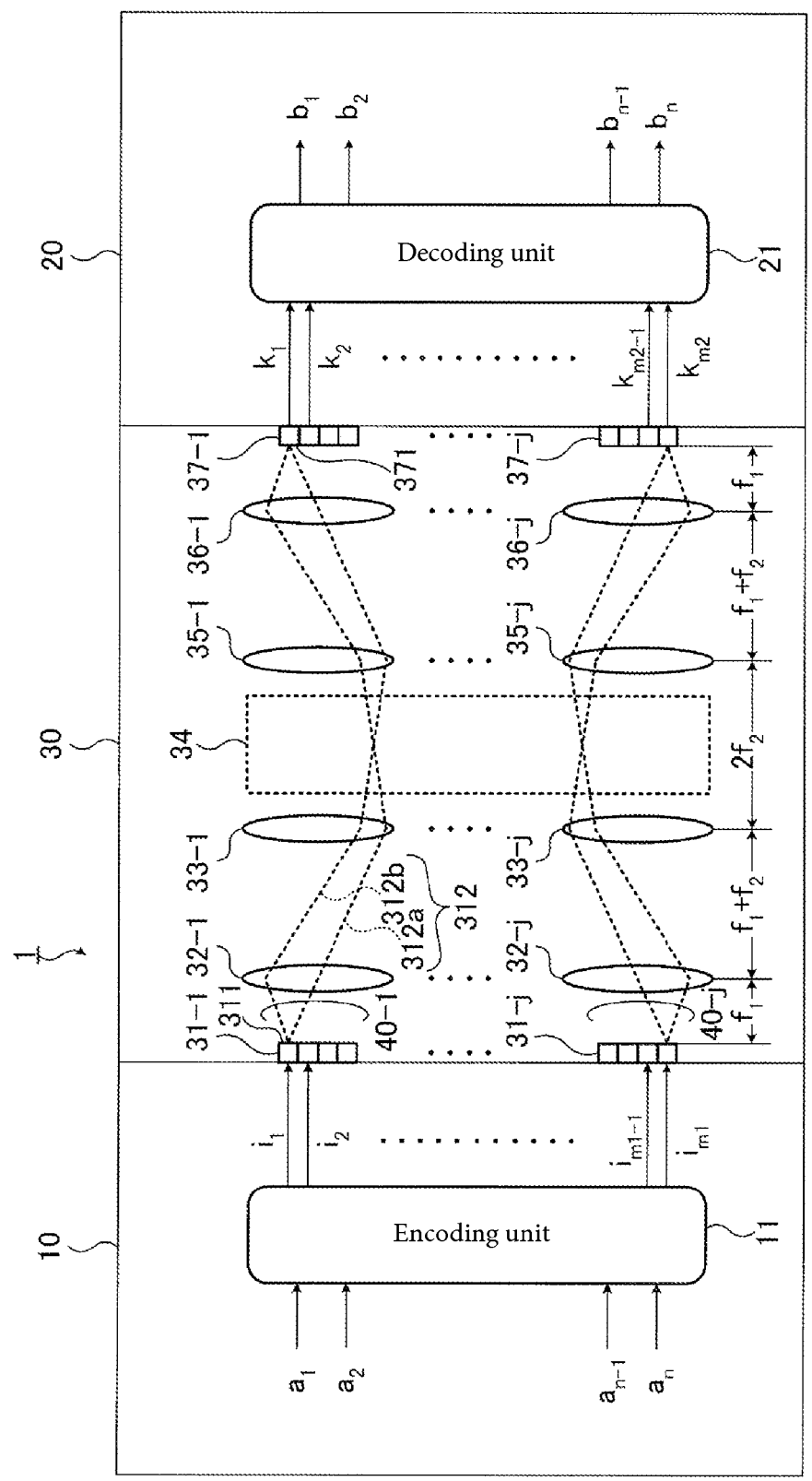
FIG. 1 is a diagram showing an example of an information processing device to which a first embodiment of the present invention has been applied.

FIG. 1 is a diagram showing an example of an information processing device to which a first embodiment has been applied. Information processing device 1 includes a first information processing block 10 for processing and outputting information, a second information processing block 20 for receiving and processing the information output from the first information processing block 10, and an optical interconnect unit 30, which is an example of an optical interconnect device for connecting the first information processing block 10 to the second information processing block 20 using light.

The first information processing block 10 includes an encoding unit 11 for encoding information $a_1$ through $a_n$ and generating signals $i_1$-$i_{m1}$ as an example of a first data set. Here, n is an integer equal to or greater than 1, m1 is an integer equal to or greater than 2, and m1≥n when n is equal to or greater than 2. The second information processing block 20 includes a decoding unit 21 for receiving signals $k_1$-$k_{m2}$ and decoding information $b_1$-$b_n$ as an example of a second data set. In the following explanation, m2 is an integer equal to or greater than 3, but m2 may be 2. Here, m2≥m1. The first information processing block 10 and the second information processing block 20 may be semiconductor chips, and a chip-to-chip connection may be established by the optical interconnect unit 30. Also, the first information processing block 10 and the second information processing block 20 may be circuit boards with electronic circuits, and a board-to-board connection may be established by the optical interconnect unit 30. Here, the light-emitting element groups 31 may be integrated into the semiconductor chip or circuit board constituting the first information processing block 10, and the light-receiving element groups 37 may be integrated into the semiconductor chip or circuit board constituting the second information processing block 20. The encoding unit 11 in the first information processing block 10 and the decoding unit 21 in the second information processing block 20 may configured using hardware or may perform their processing using software.

The optical interconnect unit 30 has j light-emitting element groups 31-1 through 31-j, each including a plurality of light-emitting elements 311. The total number of light-emitting elements 311 is m1. The light-emitting elements convert electric signals into optical signals. Each signal $i_1$ through $i_{m1}$ is connected to a light-emitting elements 311 in one of light-emitting element groups 31-1 through 31-j. When light-emitting element groups 31-1 through 31-j are not being differentiated from one another, they will be referred to as the light-emitting element groups 31. Here, j is an integer equal to or greater than 1, and j≤m1.

The optical interconnect unit 30 includes j first lenses 32-1 through 32-j which are provided opposite light-emitting element groups 31-1 through 31-j. The optical interconnect unit 30 also includes j second lenses 33-1 through 33-j, which are provided opposite the j first lenses 32-1 through 32-j. When first lenses 32-1 through 32-j are not being differentiated from one another, they will be referred to as the first lenses 32. When second lenses 33-1 through 33-j are not being differentiated from one another, they will be referred to as the second lenses 33. The light beam group 40-1 emitted from the plurality of light-emitting elements 311 in light-emitting element group 31-1 passes through the first lens 32-1 corresponding to light-emitting element group 31-1, and passes through the second lens 33-1 corresponding to the first lens 32-1. The same is true of light beam groups 40-2 through 40-j emitted from the light-emitting elements 311 included in the other light-emitting element groups 31-2 through 31-j. When light beam groups 40-1 through 40-j are not being differentiated from one another, they will be referred to as the light beam groups 40.

The optical interconnect unit 30 also includes an optical path switching unit 34 for switching the optical path of light beam groups 40-1 through 40-j, which pass through second lenses 33-1 through 33-j. The optical interconnect unit 30 also includes j third lenses 35-1 through 35-j, and j fourth lenses 36-1 through 36-j corresponding to third lenses 35-1 through 35-j. Any one of the light beam groups 40-1 through 40-j exiting the optical path switching unit 34 passes through any one of third lenses 35-1 through 35-j and fourth lenses 36-1 through 36-j. When third lenses 35-1 through 35-j are not being differentiated from one another, they will be referred to as the third lenses 35. When fourth lenses 36-1 through 36-j are not being differentiated from one another, they will be referred to as the fourth lenses 36.

The optical interconnect unit 30 also includes j light-receiving element groups 37-1 through 37-j, each including a plurality of light-receiving elements 371. The total number of light-receiving elements 371 is m2, which is greater than m1. The light-receiving elements 371 convert optical signals into electric signals. Any one of the light beam groups 40-1 through 40-j passing through any one of fourth lenses 36 is incident on any one of the light-receiving element groups 37-1 through 37-j.

When light-receiving element groups 37-1 through 37-j are not being differentiated from one another, they will be referred to as the light-receiving elements 37. The fourth lenses 36 are arranged opposite the light-receiving elements 37.

In the previous explanation, the suffixes (1-$j$) of the light beam groups 40-1 through 40-$j$ in the optical interconnect unit 30 match the suffixes (1-$j$) of the first lenses 32-1 through 32-$j$ and the second lenses 33-1 through 33-$j$. However, because the light paths of the light beam groups 40 are switched by an optical path switching unit 34, the suffixes (1-$j$) of the light beam groups 40 do not have to match the suffixes (1-$j$) of the third lenses 35-1 through 35-$j$, the fourth lenses 36-1 through 36-$j$, and the light-receiving element groups 37-1 through 37-$j$.

The light-emitting elements 311 are preferably laser diodes or light-emitting diodes (LEDs), as the linearity of the emitted light beam 312 is superior. The light emitted from the light-emitting elements 311 may be of any wavelength, including the wavelengths of visible light, ultraviolet light and infrared light. The light-receiving elements 371 may be any device that generates electric signals in response to incident light, such as photo detectors. The light-receiving elements 371 preferably have a light-receiving sensitivity corresponding to the incident light. In other words, in an information processing device 1 to which the first embodiment can be applied, the light-emitting elements 311 and light-receiving elements 371 are divided into groups. This configuration is referred to below as "using or having a group configuration." The optical path switching unit 34 will be explained below in greater detail.

Next, first lenses 32 (first lenses 32-1 through 32-$j$), second lenses 33 (second lenses 33-1 through 33-$j$), third lenses 35 (third lenses 35-1 through 35-$j$), and fourth lenses 36 (fourth lenses 36-1 through 36-$j$) will be explained.

The first lenses 32 are convex lenses with focal length $f_1$, and are arranged at positions which are focal length $f_1$ from the outlets of the light-emitting elements 311 in the light-emitting element groups 31 (outlets 314 in FIG. 5($a$) described below). The second lenses 33 are convex lenses with focal length $f_2$, and are arranged at positions which are focal length $f_1$ and focal length $f_2$ (distance $f_1+f_2$) from the first lenses 32. The third lenses 35 are convex lenses with the same focal length $f_2$ as the second lenses 33, and are arranged at positions which are a focal length twice that of focal length $f_2$ (distance $2 \times f_2$) from the second lenses 33. The fourth lenses 36 are convex lenses with the same focal length $f_1$ as the first lenses 32, and are arranged at positions which are focal length $f_1$ and focal length $f_2$ (distance $f_1+f_2$) from the third lenses 35. The light-receiving elements 371 in the light-receiving element groups 37 are arranged at positions which are focal length $f_1$ from the fourth lenses 36. When the optical path has been switched by the optical path switching unit 34, a shift in their relationship occurs. This will be explained in greater detail below.

The following is an explanation with reference to FIG. 1 of a light beam 312 in light beam group 40-1 emitted from one light-emitting element 311 in light-emitting element group 31-1. In FIG. 1, the light beam 312 passes through the first lens 32-1, second lens 33-1, third lens 35-1 and fourth lens 36-1, and is incident on light-receiving element group 37-1. In other words, the optical path has not been switched by the optical path switching unit 34. Therefore, in the light beam 312, sub-beam 312$a$ passes through the center of the first lens 32-1, and sub-beam 312$b$ passes through the periphery of the first lens 32-1. Sub-beam 312$a$ and sub-beam 312$b$ pass through second lens 33-1, third lens 35-1 and fourth lens 36-1 on different optical paths, but are focused on a single point in light-receiving element group 37-1. In other words, when the first lenses 32, second lenses 33, third lenses 35 and fourth lenses 36 are arranged at these intervals, the image at the outlets 314 of the light-emitting elements 311 in each light-emitting element group 31 is focused on the light-receiving element groups 37. The light beam group 40-1 outputted from light-emitting element group 31-1 is incident on light-receiving element group 37-1, but may be incident on another light-receiving element group 37.

The following is an explanation of the data transmission method of the information processing device 1. Information $a_1$ through $a_n$ processed by the first information processing block 10 is encoded as signals $i_1$ through $i_{m1}$ by the encoding unit 11 in the first information processing block 10. Light-emitting element groups 31-1 through 31-$j$ in the optical interconnect unit 30 convert signal sequences $i_1$ through $i_{m1}$ into light beam groups 40-1 through 40-$j$. Next, light beam groups 40-1 through 40-$j$ pass through first lenses 32-1 through 32-$j$ and second lenses 33-1 through 33-$j$. After the optical path of each of light beam groups 40-1 through 40-$j$ has been switched by the optical path switching unit 34, the light beam groups pass through third lenses 35-1 through 35-$j$ and fourth lenses 36-1 through 36-$j$, and are incident on light-receiving element groups 37-1 through 37-$j$. Each light beam 312 in light beam groups 40-1 through 40-$j$ is converted to signals $k_1$ through $k_{m2}$ by light-receiving element groups 37-1 through 37-$j$. Signals $k_1$ through $k_{m2}$ are decoded by the decoding unit 21 to obtain information $b_1$ through $b_n$. In other words, information $a_1$ through $a_n$ processed by the first information processing block 10 in the information processing device 1 is transmitted to the second information processing block 20 as information $b_1$ through $b_n$.

The following is an explanation of the relationship between information $a_1$ through $a_n$ and information $b_1$ through $b_n$. Here, information $a_1$ through $a_n$ and information $b_1$ through $b_n$ have a 1:1 correspondence. The correspondence may be such that the subscripts match or do not match. Information $a_p$ in information $a_1$ through $a_n$ may match information $b_q$ in information $b_1$ through $b_n$. Also, n1 and n2 in information $a_1$ through $a_{n1}$ and information $b_1$ through $b_{n2}$ may differ such that n1<n2. Also, a single unit of information $a_p$ may be configured so as to correspond to two units of information $b_q$ and information $b_r$. It may also correspond to more than two units of information. Conversely, n1 and n2 in information $a_1$ through $a_{n1}$ and information $b_1$ through $b_{n2}$ may differ such that n1>n2. The information corresponding to information $a_p$ does not have to be information $b_1$ through $b_{n2}$. In other words, among the information $a_1$ through $a_{n1}$ processed by the first information processing block 10, only required information $b_1$ through $b_{n2}$ may have to be transmitted to second information processing block 20. Here, p, q and r are integers satisfying the following relationships: 1≤p, q, r≤n, n1, n2.

The following is an explanation of the relationship between information $a_1$ through $a_n$ and signals $i_1$ through $i_{m1}$. Here, n is equal to or greater than 2, and n≤m1. In other words, signals is, it and such correspond to a single unit of information $a_p$ in information $a_1$ through $a_n$. A redundant configuration means information can be transmitted by another light beam 312 when one light beam 312 among the light beams 312 converted to a single unit of information $a_p$ in a light-emitting element group 31 causes blurring of the image focused on light-receiving element group 37 due to being incident on the periphery of a first lens 32, second lens 33, third lens 35 and fourth lens 36. Here, s and t are integers satisfying the following relationships: 1≤s, t≤m1.

The following is an explanation of the relationship between signals $k_1$ through $k_{m2}$ and information $b_1$ through $b_n$. Here, $m2 \geq m1$. In other words, the diameter of the light beams 312 passing through the fourth lenses 36 (the diameter of the image 315 at the output 314 in FIG. 5(a) described below) is smaller than the size of the light-receiving elements 371. In other words, a single light beam 312 may be received by a plurality of light-receiving elements 371. When a single light beam 312 is received by a plurality of light-receiving elements 371, the disappearance of signal is suppressed even when there is some discrepancy in the positional relationship between the light beam 312 and the light-receiving elements 371. If the sum of the outputs of a plurality of light-receiving elements 371 receiving a single light beam 312 is used, the S/N ratio is improved. This improves the reliability of data transmissions via optical transmission.

Figure 2:
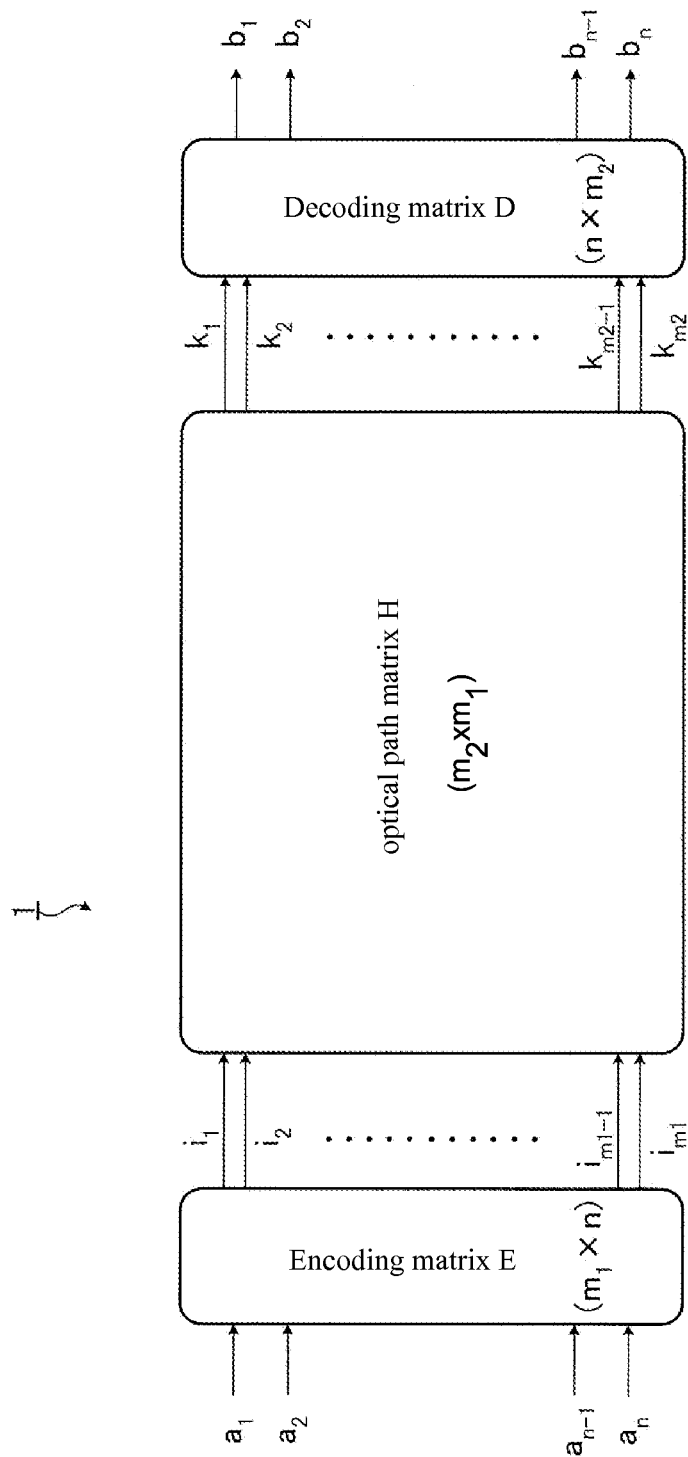
FIG. 2 is a diagram showing the transmission from information $a_1$ through $a_n$ to information $b_1$ through $b_n$ between a first information processing block and a second information processing block in an information processing device via a matrix.

FIG. 2 is a diagram showing the transmission from information $a_1$ through $a_n$ to information $b_1$ through $b_n$ between a first information processing block 10 and a second information processing block 20 in an information processing device 1 via a matrix. In FIG. 2, encoding matrix E corresponds to the encoding unit 11 in FIG. 1, decoding matrix D corresponds to decoding unit 21, and optical path matrix H is an example of a switching matrix corresponding to optical path switching unit 34. Here, information $a_p$ in information $a_1$ through $a_n$ corresponds to information $b_p$ in information $b_1$ through $b_n$. In other words, the same subscripts denote corresponding information.

Here, n units of information $a_1$ through $a_n$ are input to the encoding unit 11, and m1 signals $i_1$ through $i_{m1}$ are output. Therefore, information $a_1$ through $a_n$ and signals $i_1$ through $i_{m1}$ are each represented in an encoding matrix E with m1 rows and n columns. Also, m2 signals $k_1$ through $k_{m2}$ are input to decoding unit 21, and n units of information $b_1$ through $b_n$ are output. Therefore, signals $k_1$ through $k_{m2}$ and information $b_1$ through $b_n$ are each represented in a decoding matrix D with n rows and m2 columns.

Similarly, m1 signals $i_1$ through $i_{m1}$ are inputted to the optical interconnect unit 30, and m2 signals $k_1$ through $k_{m2}$ are outputted. Therefore, the relationship between signals $i_1$ through $i_{m1}$ and signals $k_1$ through $k_{m2}$ is represented in a light path matrix H with m2 rows and m1 columns. Thus, information $b_p$ is determined by $D \times H \times E \times a_p$ ($D \cdot H \cdot E \cdot a_p$). When encoding matrix E, decoding matrix D and optical path matrix H are used in the assembly of the information processing device 1, the relationship between information $a_1$ through $a_n$ and information $b_1$ through $b_n$ can be determined when the optical paths are changed by the optical path switching unit 34 in the optical interconnect unit 30.

Figure 3:
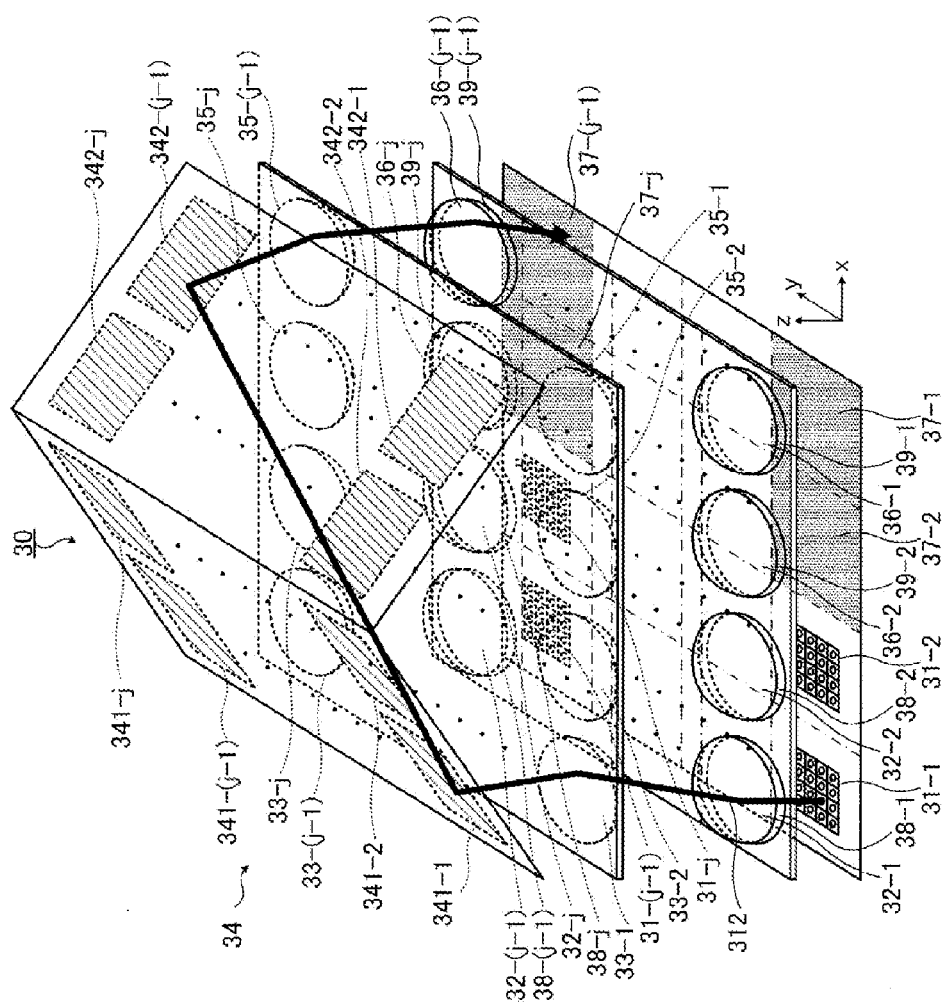
FIG. 3 is a diagram showing an example of an optical interconnect configuration in the information processing device of the first embodiment.
Figure 4:
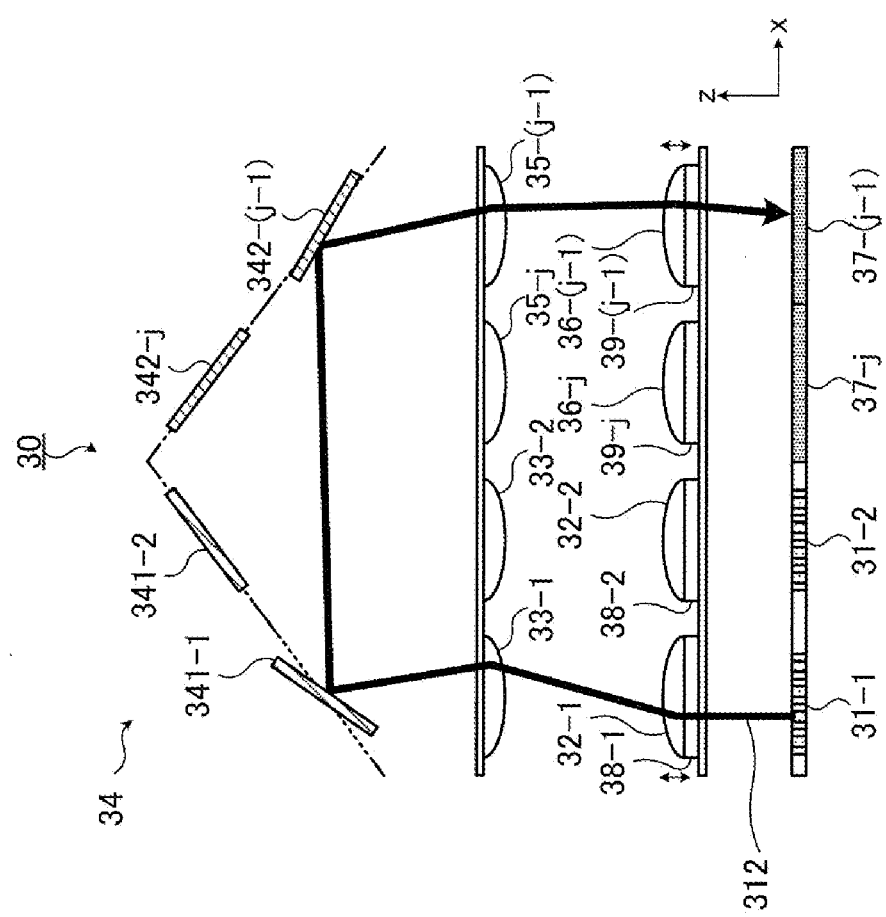
FIG. 4 is a cross-sectional view of the optical interconnect in FIG. 3 from the y-direction.

FIG. 3 is a diagram showing an example of an optical interconnect unit 30 configuration in an information processing device 1 of the first embodiment. FIG. 4 is a cross-sectional view of the optical interconnect unit 30 in FIG. 3 from the y-direction. In the optical interconnect unit 30 of the information processing device 1, as shown in FIG. 3 and FIG. 4, the left half of the light-emitting element groups 31-1 through 31-j, first lenses 32-1 through 32-j, second lenses 33-1 through 33-j, and the optical path switching unit 34 (where is x is smaller) are stacked in the z-direction on the left side of the drawing (where x is smaller).

Light-receiving element groups 37-1 through 37-j, fourth lenses 36-1 through 36-j, third lenses 35-1 through 35-j, and optical path switching unit 34 (where x is larger) are stacked in the z-direction on the right side of the drawing (where x is larger). In FIG. 3, the light-emitting element groups 31, first lenses 32, second lenses 33, third lenses 35, fourth lenses 36 and light-receiving element groups 37 use the suffixes -1, -2 towards the front of the drawing (where y is smaller), and use the suffixes -(j−1), -j towards the inside of the drawing (where y is larger). The light-emitting element groups 31, first lenses 32, second lenses 33, third lenses 35, fourth lenses 36 and light-receiving element groups 37 are aligned with each other from the front of the drawing towards the interior. Here, the first lenses 32, second lenses 33, third lenses 35 and fourth lenses 36 are examples of focusing members, and optical systems composed of first lenses 32, second lenses 33, third lenses 35 and fourth lenses 36 are examples of focusing mechanisms.

The optical path switching unit 34 serving as an example of an optical path switching mechanism has a peaked-roof shape with two inclined surfaces. In this example, optical path switching unit 34 includes flat mirrors 341-1 through 341-j on the left half (where x is smaller) serving as examples of optical path switching members able to change angle. Flat mirrors 342-1 through 342-j arranged on the right half (where x is larger) are also able to change angle. When flat mirrors 341-1 through 341-j and flat mirrors 342-1 through 342-j are not being differentiated from one another, they will be referred to as the flat mirrors 341 and flat mirrors 342. As in the case of the light-emitting element groups 31 and first lenses 32, the mirrors closer to the front of the drawing (where y is smaller) are denoted by the suffixes -1 and -2, and the mirrors farther from the front of the drawing (where y is greater) are denoted by the suffixes -(j−1) and -j. The others have been omitted from the drawing. Flat mirrors 341 and flat mirrors 342 are arranged from front to back in the drawing.

As shown in FIG. 3 and FIG. 4, the light beam groups 40 (not shown) emitted from the light-emitting element groups 31 pass through the first lenses 32 and second lenses 33, are incident on and reflected by the flat mirrors 341 on the left half of the optical path switching unit 34 (where x is smaller), and are then incident on and reflected by the flat mirrors 342 on the right half of the optical path switching unit 34 (where x is larger). After passing through the third lenses 35 and fourth lenses 36, the light beam groups are incident on light-receiving element group 37. For example, a light beam 312 included in the light beam group 40-1 (not shown) emitted from the light-emitting element group 31-1 passes through first lens 32-1 and second lens 33-1, is incident on and reflected by flat mirrors 341-1 on the left half of the optical path switching unit 34, and is then incident on and reflected by flat mirror 342-(j−1) on the right half of the optical path switching unit 34. After passing through third lens 35-(j−1) and fourth lens 36-(j−1), the light beam is incident on light-receiving element group 37-(j−1).

The angles of flat mirrors 341-1 through 341-j and flat mirrors 342-1 through 342-j are set by control signals sent by a control unit (not shown) in the first information processing block 10 or the second information processing block 20, and light is reflected and optical paths switched on the basis of these angles. Here, flat mirrors 341-1 through 341-j are configured so that any incident light beam can be reflected towards any one of flat mirrors 342-1 through 342-j. In other words, they are configured so that any light beam group 40 emitted by any light-emitting element group 31 can be received by any light-receiving element group 37 that has been selected.

Flat mirrors 341-1 through 341-j and flat mirrors 342-1 through 342-j may be set so as to correspond with the light-emitting element groups 31-1 through 31-j and light-receiving element groups 37-1 through 37-j having the same suffix. By arranging flat mirrors 341-1 through 341-*j* and flat mirrors 342-1 through 342-*j* in a peaked-roof configuration, light-emitting element groups 31-1 through 31-*j* and light-receiving element groups 37-1 through 37-*j* may be arranged in parallel on the same (x-y) plane.

The optical interconnect unit 30 includes movable elements 38-1 through 38-*j* corresponding to each of first lenses 32-1 through 32-*j* so that each of the first lenses 32-1 through 32-*j* can be moved in the z-direction. Similarly, movable elements 39-1 through 39-*j* corresponding to fourth lenses 36-1 through 36-*j* are provided so that each of fourth lenses 36-1 through 36-*j* can be moved in the z-direction. When movable elements 38-1 through 38-*j* and movable elements 39-1 through 39-*j* are not being differentiated from each other, they will be referred to as movable elements 38 and movable elements 39.

Movable elements 38 and movable elements 39 serving as examples of movable members may be piezoelectric elements made of lead zirconate titanate (PZT), and make fine adjustments in the z-direction to the positions of the first lenses 32 and fourth lenses 36 in response to electric signals from the control unit mentioned above. Movable elements 38 and movable elements 39 are arranged in positions which do not interfere with the optical paths passing through the first lenses 32 and fourth lenses 36.

First lenses 32-1 through 32-*j*, second lenses 33-1 through 33-*j*, third lenses 35-1 through 35-*j* and fourth lenses 36-1 through 36-*j* may be configured and arranged individually. Each of first lenses 32-1 through 32-*j*, second lenses 33-1 through 33-*j*, third lenses 35-1 through 35-*j* and fourth lenses 36-1 through 36-*j* may be configured as lens arrays. Also, first lenses 32-1 through 32-*j* and fourth lenses 36-1 through 36-*j* may be configured together as a lens array. Similarly, second lenses 33-1 through 33-*j* and third lenses 35-1 through 35-*j* may be configured together as a lens array. The configuration of the optical interconnect unit 30 can be simplified by using lens arrays. Second lenses 33-1 through 33-*j* and third lenses 35-1 through 35-*j* may be molded integrally from a transparent material such as glass or an acrylic. When movable elements 38 and movable elements 39 are used, first lenses 32-1 through 32-*j* and fourth lenses 36-1 through 36-*j* may be arranged on a glass or acrylic plate also including the movable elements 38 and movable elements 39. Here, a movable element (movable element 38) and another movable element (movable element 39) may be provided for all of first lenses 32-1 through 32-*j* and fourth lenses 36-1 through 36-*j* to move all of first lenses 32-1 through 32-*j* and fourth lenses 36-1 through 36-*j* as a whole. Movable elements may also be provided for each of first lenses 32-1 through 32-*j* and fourth lenses 36-1 through 36-*j*.

Similarly, flat mirrors 341-1 through 341-*j* and flat mirrors 342-1 through 342-*j* in the optical path switching unit 34 may each be configured as a micro-electro-mechanical system (MEMS) and assembled in a peaked-roof structure. Because flat mirrors 341 and flat mirrors 342 are configured in a semiconductor circuit in a MEMS, their angles can be easily set using electric signals.

The following is an explanation of the optical interconnect unit 30 using numerical values. For example, a light-emitting element group 311 may include 4×4 light-emitting elements 311, each light-emitting element having a side length u (explained below with reference to FIG. 5) of 40 µm. The size of each light-emitting element group 31 is 160 µm×160 µm. Preferably, the first lenses 32 and fourth lenses 36 have a diameter of 400 µm, which is greater than the diameter of the light-emitting element groups 31, so that the light beams 312 emitted from the light-emitting element groups 31 can be captured. Focal length $f_1$ is approximately 1 mm.

Preferably, the second lenses 33 and third lenses 35 have an even greater diameter of 600 µm, so that the light beams 312 widened by the first lenses 32 can effectively pass through. Focal length $f_2$ is approximately 10 mm. Preferably, flat mirrors 341 and flat mirrors 342 are preferably 600 µm×600 µm so as to correspond to the diameter of the second lenses 33 and third lenses 35. The size of light-emitting element groups 31 is limited by the diameter of the second lenses 33.

In FIG. 3 and FIG. 4, the optical path switching unit 34 includes flat mirrors 341-1 through 341-*j* and flat mirrors 342-1 through 342-*j*, and a light beam 312 reflected by any of one of flat mirrors 341-1 through 341-*j* is reflected by any one of 342-1 through 342-*j* and focused on the light-receiving element groups 37. Optical path switching is made even easier when the light beams are reflected twice. However, an optical path switching unit 34 does not have to include either flat mirrors 341-1 through 341-*j* or flat mirrors 342-1 through 342-*j*, and optical paths may be switched by reflecting light beams once.

Figure 5:
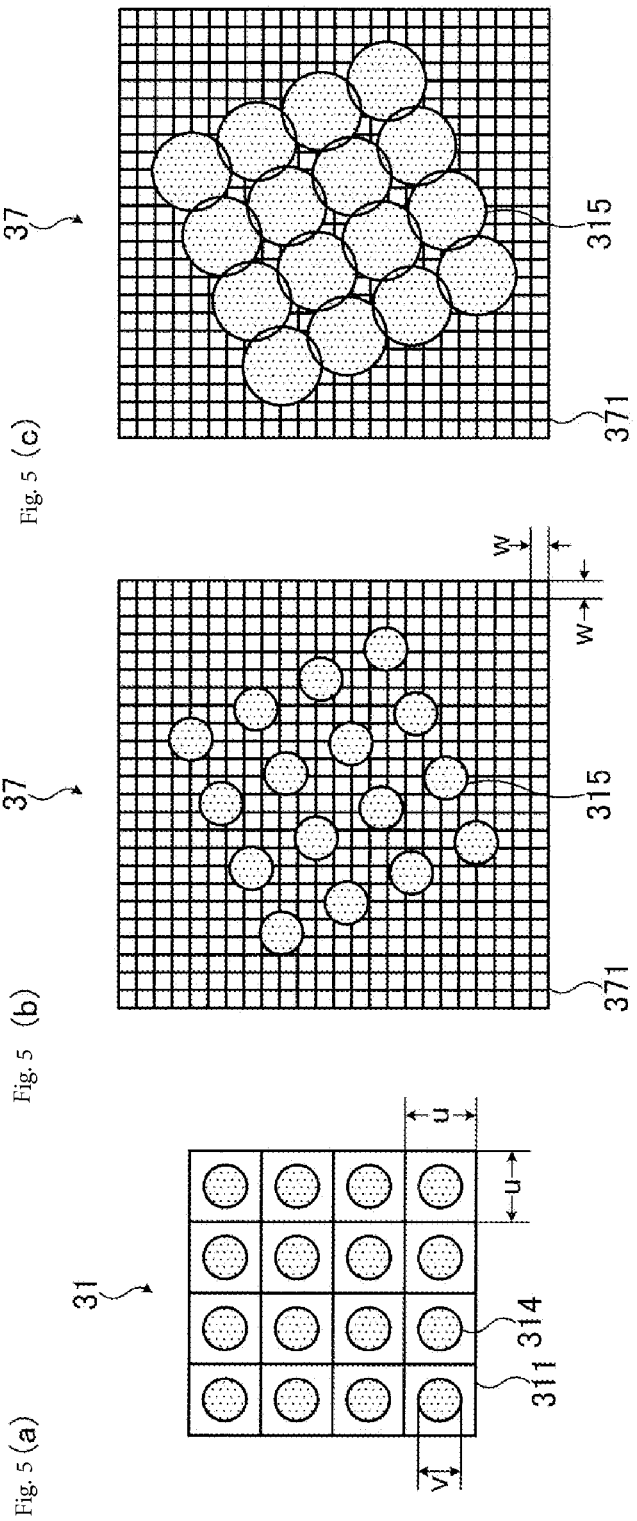
FIG. 5(a)-(c) are diagrams used to explain the relationship between light-emitting element groups and light-receiving element groups.

FIG. 5(*a*) are diagrams used to explain the relationship between light-emitting element groups 31 and light-receiving element groups 37. FIG. 5 (*a*) shows an example of outlets 314 from which the light of the light-emitting elements 311 in a light-emitting element group 31 is emitted. FIG. 5 (*b*) is an example of an image 315 of the output of the light-emitting elements 311 in a light-emitting element group 31, which is incident on a light-receiving element group 37, FIG. 5 (*c*) shows another example of an image 315 of the output of the light-emitting elements 311 in the light-emitting element group 31. which is incident on the light-receiving element group 37. Here, the light-emitting element group 31 includes 4×4 or 16 light-emitting elements 311. The light beams 312 emitted from the light-emitting element group 31 (see FIG. 3 and FIG. 4) are incident on the light-receiving element group 37.

As shown in FIG. 5 (*a*), the planar shape of the light-emitting elements 311 in the light-emitting element group 31 are square with a side length of u. The outlets 314 from which light is emitted by the light-emitting elements 311 have a diameter of v. As shown in FIG. 5 (*b*), the planar shape of the light-receiving elements 371 in the light-receiving element group 37 is square with a side length of w, which is shorter than the diameter v (w<v). For example, the side length u of the light-emitting elements 311 is 40 µm, and the diameter v of the outlets 314 of the light-emitting elements 311 is 20 µm. The side length w of the light-receiving elements 371 is 2 µm. In this example, the side length u of the light-emitting elements 311 is 20 times the side length w of the light-receiving elements 371.

When the side length w of the light-receiving elements 371 is smaller than the diameter v of the outlets 314 in the light-emitting elements 311, as shown in FIG. 5 (*b*), the image 315 at the outlets 314 of the light-emitting elements 311 in each light-emitting element group 31 expands and is imaged on a plurality of light-receiving elements 371. Therefore, the sum of the signals $k_q$ from the light-receiving elements 371 on which the image 315 at the outlet 314 of a single light-emitting element 311 has been focused corresponds to the signals $i_p$ from the single light-emitting element 311. For example, when the outlet 314 of a light-emitting element 311 is focused on light-receiving elements 371 at the same magnification, the image 315 from the outlet 314 of a single light-emitting element 311 is imaged on 78 light-receiving elements 371. Therefore, as shown in FIG. 5 (b), signal $k_p$ is obtained from the light emitted by the light-emitting elements 311 even when an image 315 from the outlets of 16 light-emitting elements 311 has been distorted and focused on an array of light-receiving elements 371.

As shown in FIG. 5 (c), images 315 from the outlets 314 of light-emitting elements 311 focused on light-receiving element groups 37 are often blurred and often overlap due to misalignment in the optical interconnect unit 30. In these situations, the presence or absence of signal $i_p$ from the light-emitting elements 311 can be determined using the sum of signal $k_q$ from a plurality of light-receiving elements 371. This can reduce erroneous reception of signal $i_p$. In FIG. 5 (c), images 315 from the outlets 314 of the light-emitting elements 311 in a single light-emitting element group 31 overlap, but images 315 from the outlets 314 of light-emitting elements 311 in different light-emitting element groups 31 can also overlap.

Figure 6:
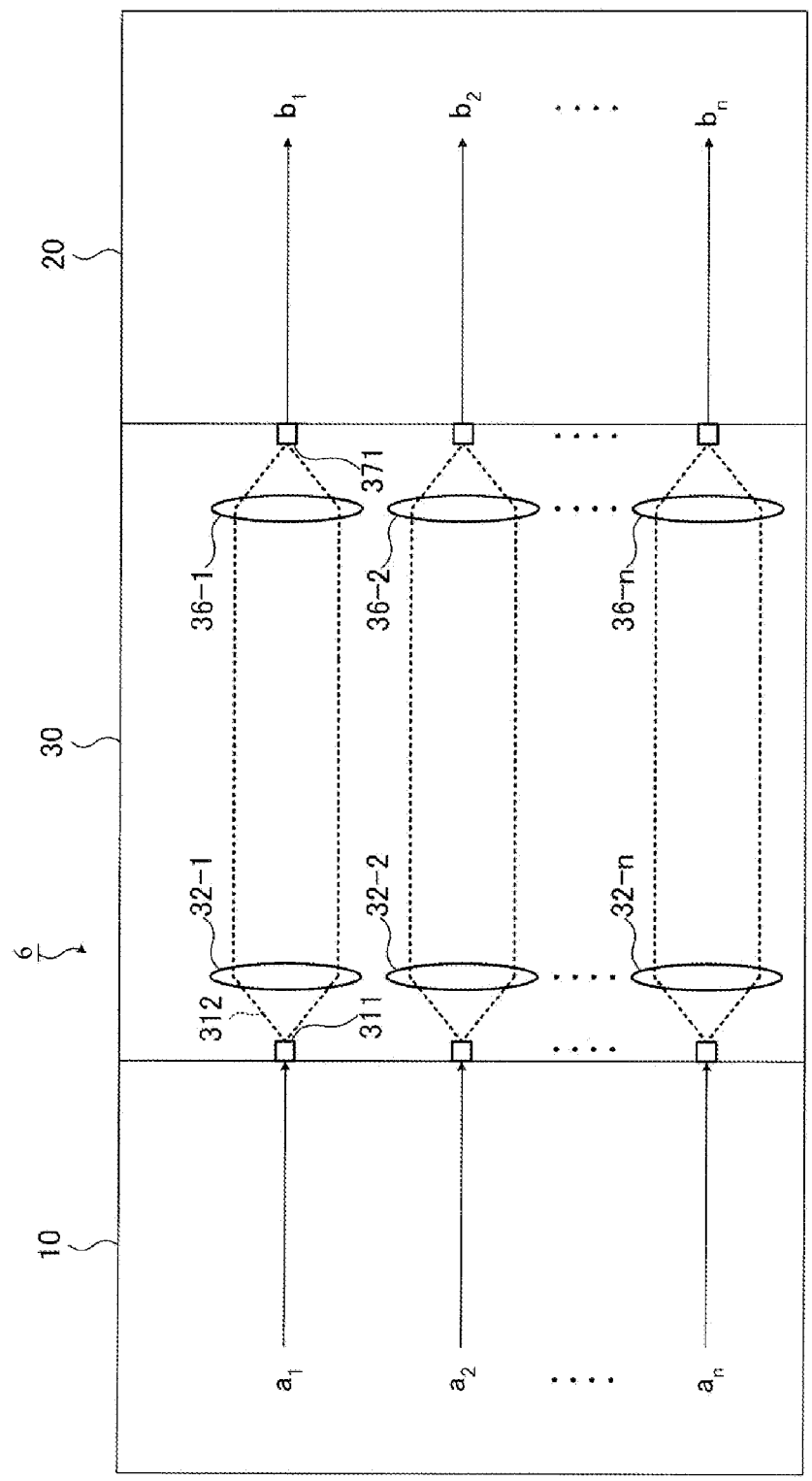
FIG. 6 is a diagram showing an example of an information processing device to which the first embodiment has not been applied.

FIG. 6 is a diagram showing an example of an information processing device 6 to which the first embodiment has not been applied. The information processing device 6 to which the first embodiment has not been applied differs from the information processing device 1 to which the first embodiment has been applied in that it does not include an encoding unit 11 in the first information processing block 10 and a decoding unit 21 in the second information processing block 20. In addition, the optical interconnect unit 30 does not include second lenses 33, third lenses 35 and an optical path switching unit 34.

The optical interconnect unit 30 in the information processing device 6 includes n light-emitting elements 311 corresponding to information $a_1$ through $a_n$ generated by the first information processing block 10. It also includes n first lenses 32-1 through 32-n corresponding to the n light-emitting elements 311. It also includes n fourth lenses 36-1 through 36-n corresponding to first lenses 32-1 through 32-n. It also includes n light-receiving elements 371 corresponding to fourth lenses 36-1 through 36-n. When first lenses 32-1 through 32-n and fourth lenses 36-1 through 36-n are not being differentiated from one another, they will be referred to as the first lenses 32 and fourth lenses 36.

Here, information $a_1$ through $a_n$ is converted to light beams 312 by the corresponding light-emitting element 311, incident on the light-receiving elements 371 via the first lenses 32 and fourth lenses 36. The light signals are converted to electric signals by the light-receiving elements 371 to obtain information $b_1$ through $b_n$. The light beams 312 are transmitted as parallel beams between the first lenses 32 and the fourth lenses 36. In other words, in an information processing device 6 to which the first embodiment has not been applied, the light-emitting elements 311 and light-receiving elements 371 have not been grouped. This configuration is referred to as "not using or having a group configuration."

Therefore, the optical interconnect unit 30 is configured so that light beams 312 emitted from the light-emitting elements 311 are received by the corresponding light-receiving elements 371. In other words, the number of light-emitting elements 311 and light-receiving elements 371 arranged per unit area in the optical interconnect unit 30 is limited by the widening of the light beams 312 emitted from the light-emitting elements 311 and by the diameter of the first lenses 32 and the fourth lenses 36.

Figure 7:
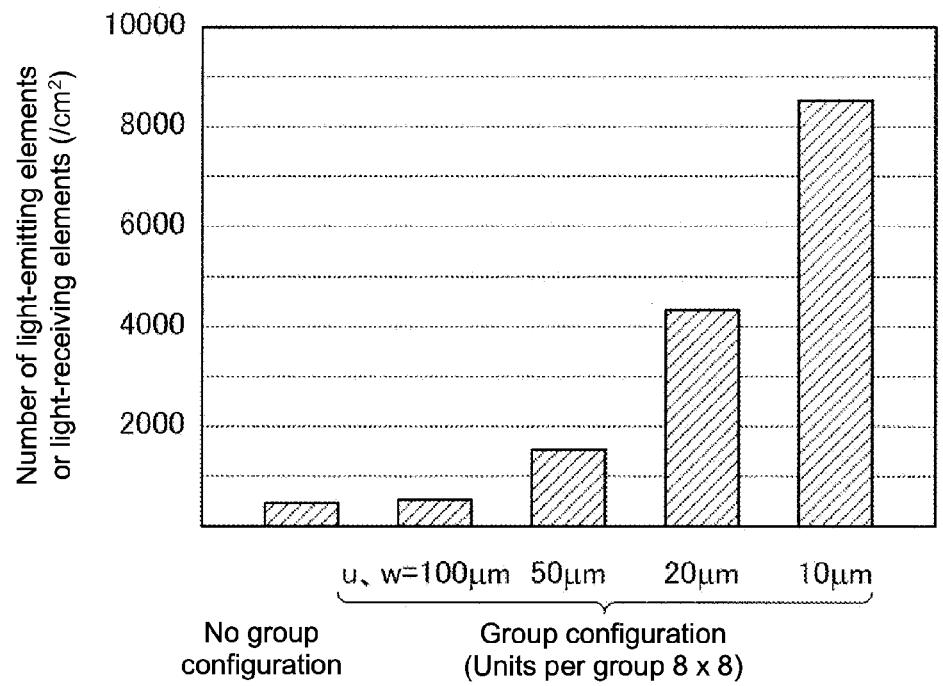
FIGS. 7(a) and (b) are diagrams showing the results of calculating the number of light-emitting elements or light-receiving elements (/cm$^2$) for an optical interconnect in an information processing device to which the first embodiment has been applied (using a group configuration), and for an optical interconnect in an information processing device to which the first embodiment has not been applied (not using a group configuration).
FIG. 7(b) shows results comparing the number of light-emitting elements or light-receiving elements per group when a group configuration is used.
Figure 7:
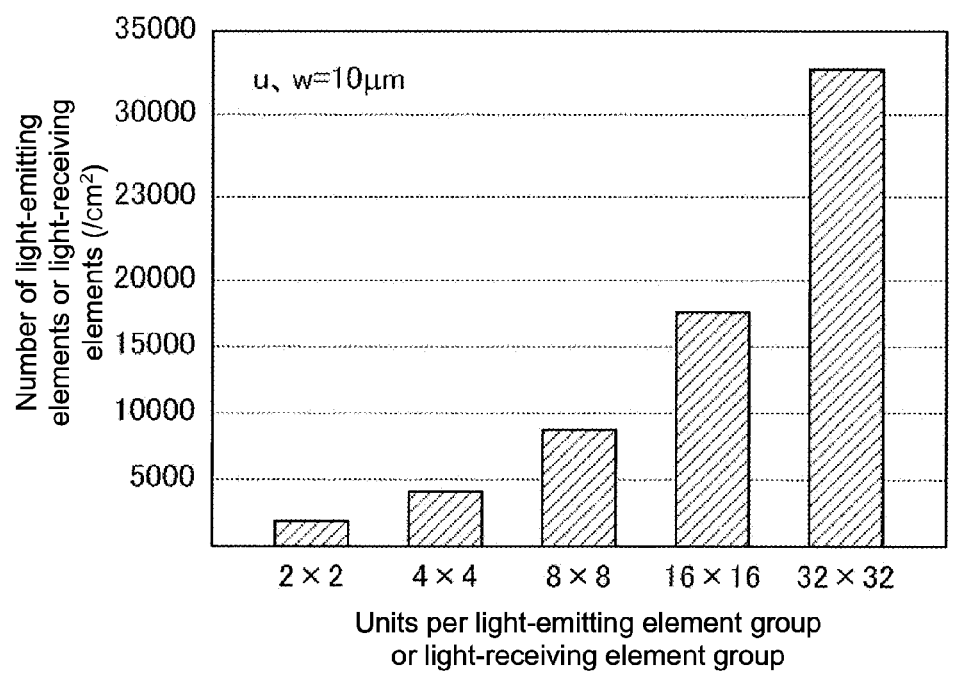

FIG. 7(a)-(b) are diagrams showing the results of calculating the number of light-emitting elements 311 or light-receiving elements 371 (/cm$^2$) for an optical interconnect unit 30 in an information processing device 1 to which the first embodiment has been applied (using a group configuration), and for an optical interconnect unit 30 in an information processing device 6 to which the first embodiment has not been applied (not using a group configuration). FIG. 7 (a) shows results comparing an optical interconnect unit using a group configuration to an optical interconnect not using a group configuration, and FIG. 7 (b) shows results comparing the number of light-emitting elements or light-receiving elements per group when a group configuration is used. The number (/cm$^2$) of light-emitting elements 311 or light-receiving elements 371 was calculated so as to take into account the widening of light beams.

As shown in FIG. 7 (a), in an optical interconnect unit 30 for an information processing device 6 to which the first embodiment has not been applied (not using a group configuration), there are restrictions resulting from the widening of light beams 312 and the size of the first lenses 32 and the fourth lenses 36 as shown in FIG. 6, even when the side length u of the light-emitting elements 311 or the side length w of the light-receiving elements 371 is changed, and the number of light-emitting elements 311 or light-receiving elements 371 (/cm$^2$) is approximately 500 units/cm2. In this explanation, the optical interconnect unit 30 in an information processing device 1 to which the first embodiment has been applied (using a group configuration) includes 8×8 or 64 light-emitting elements 311 (side length u) or light-receiving elements 371 (side length w) in a group. When the side lengths u, w are 100 μm, the number (/cm$^2$) of light-emitting elements 311 or light-receiving elements 371 is approximately 600 units/cm$^2$, so the difference is slight compared to the 500 units/cm$^2$ in an optical interconnect unit 30 (not using a group configuration) in an information processing device 1 to which the first embodiment described above has not been applied. However, as the side length u, w becomes progressively smaller (50 μm, 20 μm, 10 μm, etc.), the number (/cm$^2$) of light-emitting elements 311 or light-receiving elements 371 increases. For example, when the side length u, w is 10 μm, the number (/cm2) of light-emitting elements 311 or light-receiving elements 371 is 8,500 units/cm$^2$.

When the side length u, w is 10 μm, as shown in FIG. 7 (b), and the number of light-emitting element groups 31 or light-receiving element groups 37 is 2×2 or 4 groups, the number (/cm$^2$) of light-emitting elements 311 or light-receiving elements 371 is approximately 2,000 units/cm$^2$, but approximately 33,000 units/cm2 at 32×32 or 1,024 groups.

In an information processing device of the first embodiment, as explained above, the light-emitting elements 311 are divided into light-emitting element groups 31-1 through 31-j, the light-receiving elements 371 are divided into light-receiving element groups 37-1 through 37-j, and first lenses 32, second lenses 33, third lenses 35 and fourth lenses 36 are provided for each group. This increases the per-unit area number (/cm$^2$) of light-emitting elements 311 and light-receiving elements 371 in the optical interconnect unit 30. In other words, the optical interconnect unit 30 has a high-density configuration.

The function of the information processing device 6 can also be reconfigured by switching the optical paths of the light beam groups 40 using the optical path switching unit 34.

Figure 8:
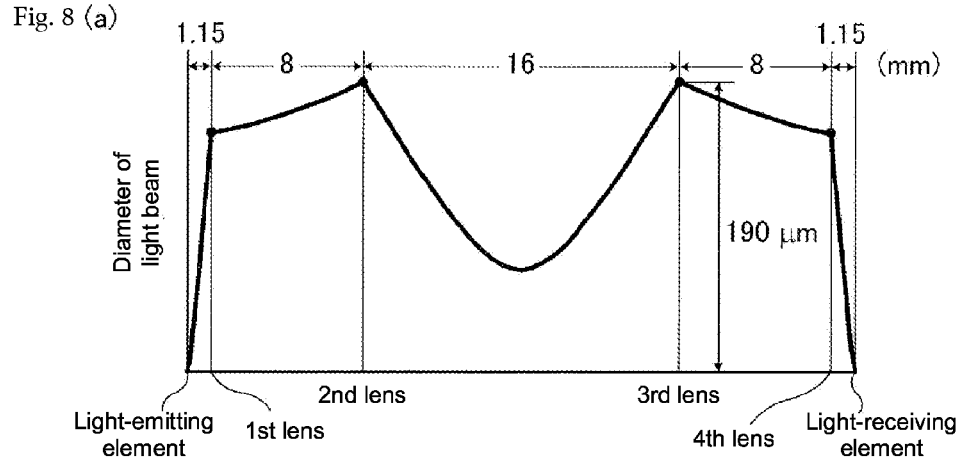
FIG. 8(a)-(c) are diagrams used to explain an example of the change in light beam diameter when the optical path of a group of light beams is switched using an optical path switching unit.
Figure 8:
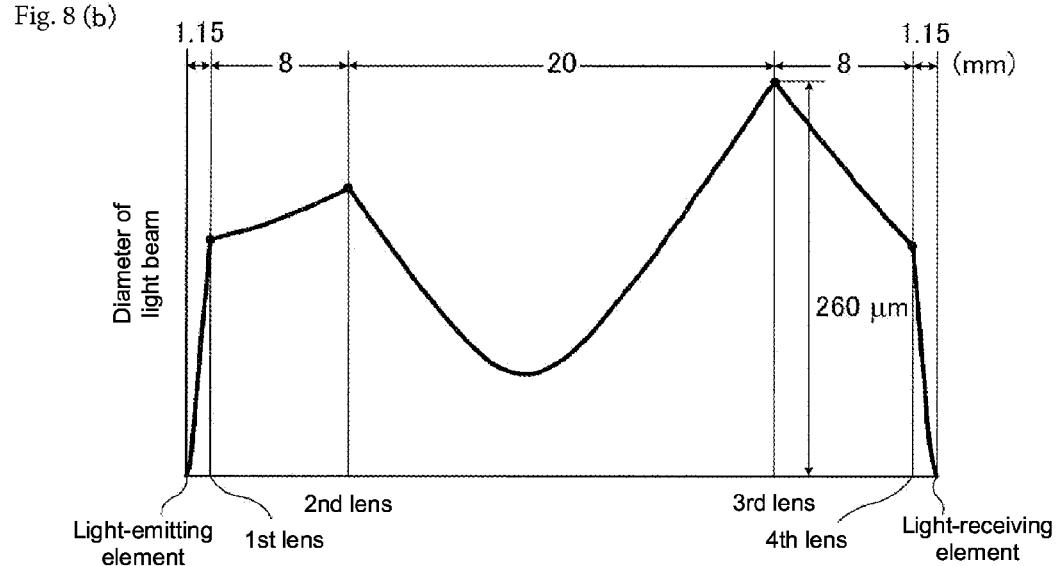
Figure 8:
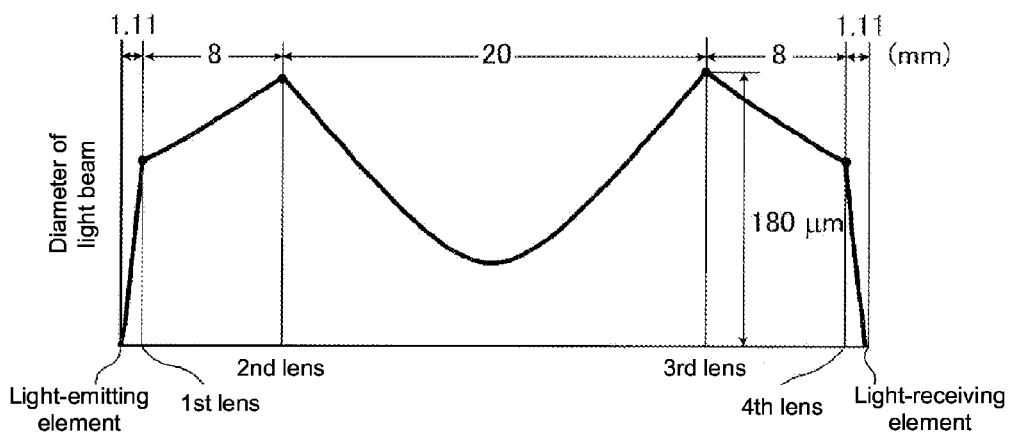

FIG. 8(a)-(c) are diagrams used to explain an example of the change in light beam diameter when the optical path of a light beam group 40 is switched using an optical path switching unit 34. In FIG. 8 (a), the distance between the second lens 33 and the third lens 35 is 16 mm. In FIG. 8 (b), the distance between the second lens 33 and the third lens 35 is 20 mm. In FIG. 8 (c), the distance between the second lens 33 and the third lens 35 is 20 mm, and the positions of the first lens 32 and the fourth lens 36 have been changed. In FIGS. 8 (a), (b) and (c), the horizontal axis denotes the distance between each of the light-emitting elements 311, first lenses 32, second lenses 33, third lenses 35, fourth lenses 36 and light-receiving elements 371. The vertical axis denotes the diameter of the light beams.

As shown in FIG. 8 (a), when the distance between the second lens 33 and the third lens 35 is 16 mm, the maximum value of the diameter of the light beams 312 is 190 μm. Next, as shown in FIG. 8 (b), when the optical paths of the light beam group 40 is switched by the optical path switching unit 34 and the distance between the second lens 33 and the third lens 35 is 20 mm, the maximum value of the diameter of the light beams 312 increases to 260 μm. However, when the distance between the light-emitting elements 311 and first lenses 32, and the distance between the fourth lenses 36 and the light-receiving elements 371 is reduced from 1.15 mm in FIG. 8 (a) to 1.11 mm in FIG. 8 (c), the maximum value for the diameter of the light beams 312 is reduced to 180 μm. In other words, in FIG. 8 (a) and FIG. 8 (b), the length of the optical path increases 4 mm and the diameter of the light beams increases. However, as shown in FIG. 8 (c), when the distance between the light-emitting elements 311 and the first lenses 32, and the distance between the fourth lenses 36 and light-receiving elements 371 is finely adjusted by 0.04 mm (40 μm), the increase in the diameter of the light beam is suppressed.

The distance between the light-emitting elements 311 and the first lenses 32, and the distance between the fourth lenses 36 and light-receiving elements 371 may be changed using movable elements 38-1 through 38-j and moveable elements 39-1 through 39-j shown in FIG. 3 and FIG. 4. Each of movable elements 38-1 through 38-j and moveable elements 39-1 through 39-j can make fine adjustments independently. When the optical paths of a light beam group 40 have been switched by the optical path switching unit 34, fine adjustments are made to z-direction positions of the first lenses 32 and/or fourth lenses 36 in response to the distance between the second lenses 33 and the third lenses 35 in order maintain a smaller light beam diameter.

Therefore, as explained in FIG. 5, reliable data transmission can be realized when the optical paths of a laser beam group 40 are switched by the optical path switching unit 34 and the distance between the second lenses 33 and the third lenses 35 is changed by making the side length w of the light-receiving elements 371 smaller than the side length u of the light-emitting elements 311.

Figure 9:
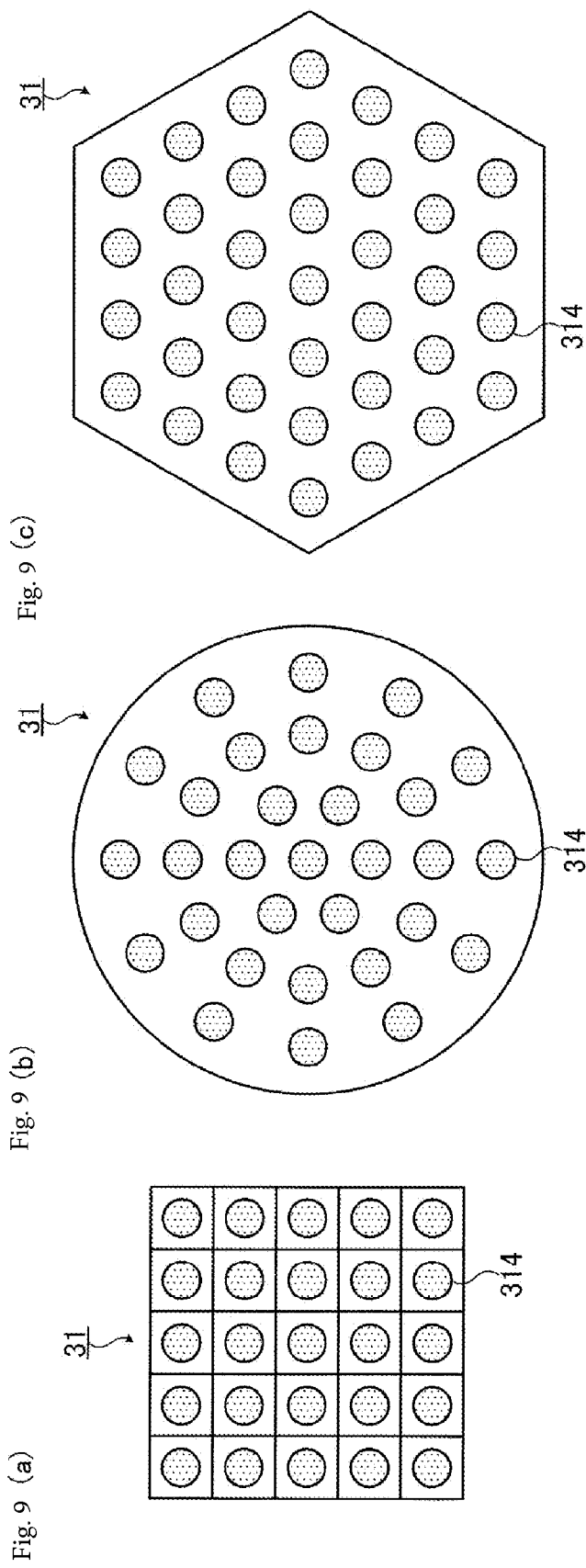
FIG. 9(a)-(c) are diagrams used to explain examples of outlet arrangements for the light-emitting elements in a light-emitting element group.

FIG. 9(a)-(c) are diagrams used to explain examples of outlet arrangements for the light-emitting elements 311 in a light-emitting element group 31. FIG. 9 (a) shows a grid-like arrangement, FIG. 9 (b) shows a radial arrangement, and FIG. 9 (c) shows a honeycomb arrangement. FIG. 9 (b) and FIG. 9 (c) show only the outlets 314. The boundaries between light-emitting elements 311 are not shown.

The arrangement of the outlets 314 in the light-emitting elements 311 of the light-emitting element group 31 in FIG. 5 (a) is the lattice-like arrangement shown in FIG. 9 (a). However, the arrangements in FIG. 9 (b) and FIG. 9 (c) can be used. Another arrangement can be used as well. Similarly, the arrangement of the light-receiving elements 371 in the light-receiving element group 37 is the lattice-like arrangement in FIG. 5 (b) and FIG. 5 (c). However, as in the case of the outlets 314 of the light-emitting elements 311 in FIG. 9 (b) and FIG. 9 (c), the arrangement can be radial or honeycomb-shaped as well. Another arrangement may also be used.

In the first embodiment, flat mirrors 341 and flat mirrors 342 were used in the optical path switching unit 34 of the information processing device 1. In a second embodiment, concave mirrors 343-1 through 343-j and concave mirrors 344-1 through 344-j are used in the optical path switching unit 34 of an information processing device. The second lenses 33 and third lenses 35 in the optical path switching unit 34 of the first embodiment are also eliminated. When concave mirrors 343-1 through 343-j and concave mirrors 344-1 through 344-j are not being differentiated from one another, they will be referred to as the concave mirrors 343 and concave mirrors 344.

In the second embodiment, a reflecting function is added to the flat mirrors 341 and flat mirrors 342 in the optical path switching unit 34 of the first embodiment in the form of concave mirrors 343 and concave mirrors 344. These provide the focusing function. This reduces the number of components in the optical path switching unit 34. Because the rest of the configuration is identical to that of the information processing device in the first embodiment, the identical components are denoted by the same reference numbers and further explanation of these components has been omitted.

Figure 10:
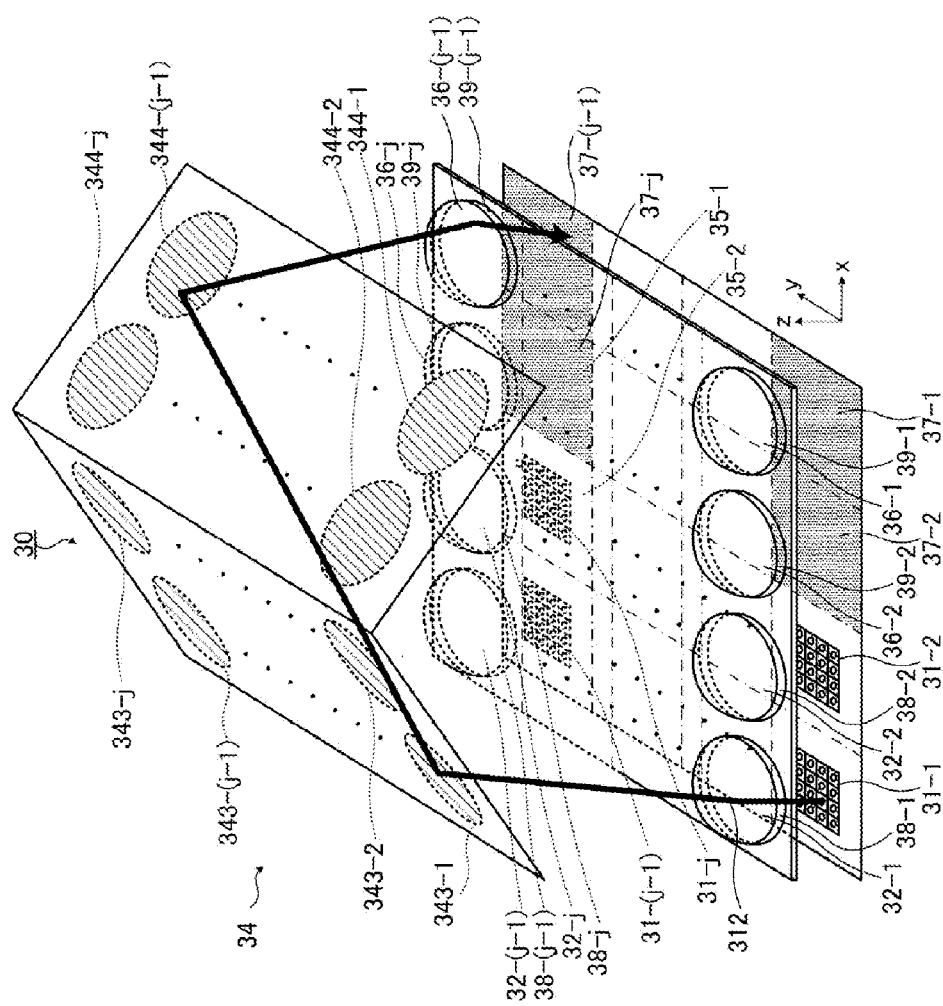
FIG. 10 is a diagram showing an example of an optical interconnect configuration in the information processing device of the second embodiment.
Figure 11:
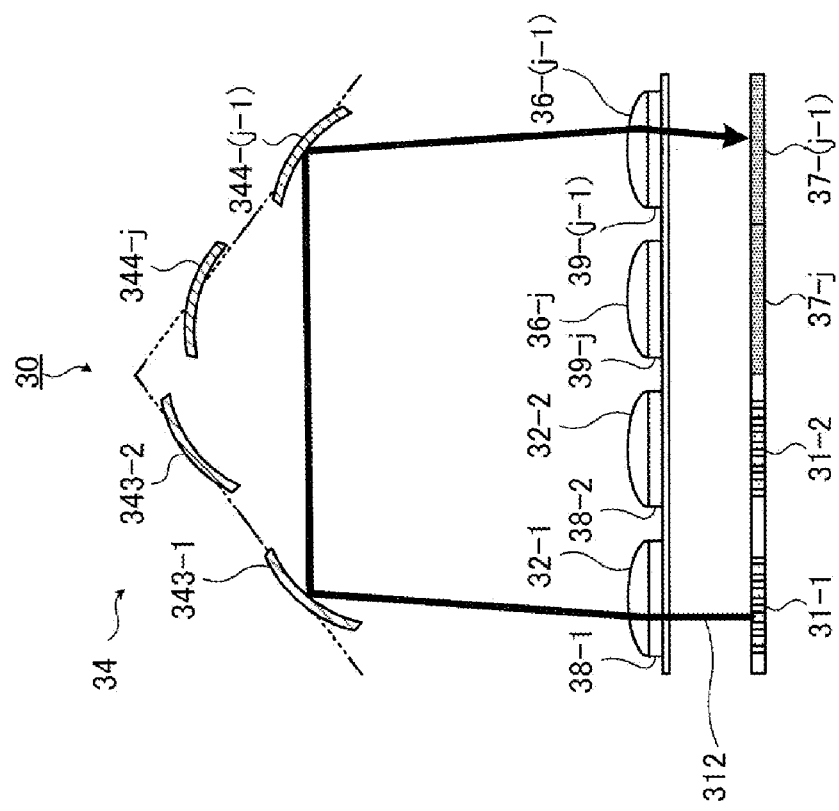
FIG. 11 is a cross-sectional view of the optical interconnect in FIG. 10 from the y-direction.

FIG. 10 is a diagram showing an example of the configuration of an optical interconnect unit 30 in the information processing device of the second embodiment. FIG. 11 is a cross-sectional view of the optical interconnect unit 30 in FIG. 10 from the y-direction. As shown in FIG. 10, the optical path switching unit 34 in the optical interconnect unit 30 includes concave mirrors 343-1 through 343-j on the left side (where x is smaller), and concave mirrors 344-1 through 344-j on the right side (where x is larger). As in the case of the first embodiment, the suffixes -1, -2 are used towards the front of the drawing (where y is smaller), and the suffixes -(j−1), -j are used towards the back of the drawing (where y is larger). The rest of the description has been omitted. The concave mirrors 343 and concave mirrors 344 are arranged from the front of the drawing inward. The second lenses 33 and third lenses 35 shown in FIG. 3 are not included.

As shown in FIG. 10 and FIG. 11, the light beam groups 40 (not shown) emitted from the light-emitting element groups 31 pass through the first lenses 32, are incident on and reflected by the concave mirrors 343 on the left half of the optical path switching unit 34 (where x is smaller), and are then incident on and reflected by the concave mirrors 344 on the right half of the optical path switching unit 34 (where x is larger). After passing through the fourth lenses 36, the light beam groups are incident on light-receiving element group 37. For example, a light beam 312 included in the light beam group 40-1 (not shown) emitted from the light-emitting element group 31-1 passes through first lens 32-1, is incident on and reflected by concave mirror 343-1 on the left half of the optical path switching unit 34, and is then incident on and reflected by concave mirror 344-(j−1) on the right half of the optical path switching unit 34. After passing through fourth lens 36-(j−1), the light beam is incident on light-receiving element group 37-(j−1).

The angles of concave mirrors 343-1 through 343-j and concave mirrors 344-1 through 344-j are set by control signals sent by a control unit (not shown) in the first information processing block 10 or the second information processing block 20, and light is reflected and optical paths switched on the basis of the angles and curvature of the mirrors. Here, concave mirrors 343-1 through 343-j are configured so that any incident light beam can be reflected towards any one of concave mirrors 344-1 through 344-j. In other words, they are configured so that any light beam group 40 emitted by any light-emitting element group 31 can be received by any light-receiving element group 37. Concave mirrors 343-1 through 343-j and concave mirrors 344-1 through 344-j may be configured in MEMS and combined in the form of a peaked-roof structure.

In FIG. 10 and FIG. 11, the optical path switching unit 34 includes concave mirrors 343-1 through 343-j and concave mirrors 344-1 through 344-j, and a light beam 312 reflected by any of one of concave mirrors 343-1 through 343-j is reflected by any one of 344-1 through 344-j and focused on the light-receiving element groups 37. Optical path switching is made even easier when the light beams are reflected twice. However, an optical path switching unit 34 does not have to include either concave mirrors 343-1 through 343-j or concave mirrors 344-1 through 344-j, and optical paths may be switched by reflecting light beams once.

The optical interconnect unit 30 shown in FIG. 10 through FIG. 11 does not include the second lenses 33 and third lenses 35 shown in FIG. 3 and FIG. 4. However, second lenses 33 and third lenses 35 may be included, and the image 315 at the outlets 314 of the light-emitting elements 311 may be focused on the light-receiving elements 371 using first lenses 32, second lenses 33, concave mirrors 343, concave mirrors 344, third lenses 35 and fourth lenses 36. It may also be configured using either second lenses 33 or third lenses 35 but not both.

What is claimed is:

1. An information processing device comprising:
   a first information processing block for generating a plurality of first data sets;
   a second information processing block for receiving input of a plurality of second data sets;
   an optical interconnect unit for transmitting the plurality of first data sets from the first information processing block using a light beam, and inputting the data sets to the second information processing block as the plurality of second data sets, wherein the optical interconnect unit comprises:
      a plurality of light-emitting element groups each having a plurality of light-emitting elements;
      a plurality of light-receiving element groups each having a plurality of light-receiving elements;
      a plurality of focusing mechanisms each including at least a first convex lens, a second convex lens, a third convex lens, and a fourth convex lens, the focusing mechanisms being provided in parallel to each light-emitting element group included in the plurality of light-emitting element groups to integrate light beams from the plurality of light-emitting elements in the light-emitting element group and to focus the light beams on any light-receiving element group included in the plurality of light-receiving element groups;
   wherein the first convex lens is arranged opposite the light-emitting element group and the fourth convex lens is arranged opposite the light-receiving element group in each focusing mechanism among the plurality of focusing mechanisms, and wherein each focusing mechanism further includes a movable member that is able to change the position of the first convex lens in a direction extending from the light-emitting element group to the light-receiving element group;
   wherein, in each focusing mechanism among the plurality of focusing mechanisms, the second convex lens is arranged opposite the first convex lens, the first convex lens intervening between the light-emitting element group and the second convex lens, and the third convex lens is arranged opposite the fourth convex lens, the fourth convex lens intervening between the light-receiving element group and the third convex lens; and
   wherein the movable member is a piezoelectric element, and the movable member is arranged in a position that allows the movable member to not interfere with optical paths between lenses.

2. The information processing device according to claim 1, wherein the optical interconnect unit further comprises:
   in the optical interconnect unit, a light beam from at least one light-emitting element among the plurality of light-emitting elements included in at least one of the plurality of light-emitting element groups being focused on two or more light-receiving elements included in a corresponding light-receiving element group.

3. The information processing device according to claim 2, wherein the plurality of light-emitting element groups include at least two light-emitting elements, the plurality of light-receiving element groups include at least three light receiving elements and the plurality of light-receiving element groups include at least more light-receiving elements than the number of light-emitting elements, and the light beam from one light-emitting element included in one light-emitting element group among the light-emitting element groups is focused on two or more light-receiving elements included in any light-receiving element group among the light-receiving element groups.

4. The information processing device according to claim 2, wherein the number of first data sets output by the first information processing block is at least one, and the number of second data sets inputted to the second information processing block is at least one.

5. The information processing device according to claim 4, wherein:
   the first information processing block includes an encoder for encoding the first data sets into signals supplied to the light-emitting elements, and
   the second information processing block includes a decoder for decoding signals from the light-receiving elements into the second data sets.

6. A data transmission method for an information processing device, the data transmission method comprising the steps of:
   encoding at least one first data sets into at least two signals using an encoding matrix including preset correspondence relationships, wherein the number of signals is greater than the number of first data sets;
   switching the signals into at least three signals using a switching matrix including preset correspondence relationships;
   decoding the signals into at least one second data sets using a decoding matrix including preset correspondence relationships, wherein the number of second data sets is less than the number of switched signals, wherein transmission of data sets further comprises transmitting data through an optical interconnect device, wherein the encoding matrix, the switching matrix, and the decoding matrix are included within the optical interconnect device, and wherein transmitting data through the optical interconnect device further comprises transmitting data sets through:

a plurality of light-emitting element groups each having a plurality of light-emitting elements;

a plurality of light-receiving element groups each having a plurality of light-receiving elements;

a plurality of focusing mechanisms each including at least a first convex lens, a second convex lens, a third convex lens, and a fourth convex lens, the focusing mechanisms being provided in parallel to each light-emitting element group included in the plurality of light-emitting element groups to integrate light beams from the plurality of light-emitting elements in the light-emitting element group and to focus the light beams on any light-receiving element group included in the plurality of light-receiving element groups;

wherein the first convex lens is arranged opposite the light-emitting element group and the fourth convex lens arranged opposite the light-receiving element group in each focusing mechanism among the plurality of focusing mechanisms, and wherein each focusing mechanism further includes a movable member that is able to change the position of the first convex lens in a direction extending from the light-emitting element group to the light-receiving element group;

wherein, in each focusing mechanism among the plurality of focusing mechanisms, the second convex lens is arranged opposite the first convex lens, the first convex lens intervening between the light-emitting element group and the second convex lens, and the third convex lens is arranged opposite the fourth convex lens, the fourth convex lens intervening between the light-receiving element group and the third convex lens; and wherein the movable member is a piezoelectric element, and the movable member is arranged in a position that allows the movable member to not interfere with optical paths between lenses.

7. An optical interconnect device comprising:

a plurality of light-emitting element groups, each light-emitting element group including a plurality of light-emitting elements;

a plurality of light-receiving element groups, each light-receiving element group including a plurality of light-receiving elements, wherein a plurality of optical paths originate at the light-emitting element groups and terminate at the plurality of light-receiving element groups;

a first plurality of optical path switching members disposed along the plurality of optical paths, wherein each first optical path switching member is connected to a respective optical path switching mechanism that adjusts an orientation of the connected first optical path switching member to selectively direct a light beam along an optical path of the plurality of optical paths that is selected from among optical paths that correspond to at least one light-emitting element group that is aligned with the connected first optical path switching member;

a first array of convex lenses provided in parallel to the plurality of light-emitting element groups and intervening along the plurality of optical paths between the plurality of light-emitting element groups and the first plurality of optical path switching members, wherein each convex lens of the first array of convex lenses is aligned with a respective light-emitting element group;

a second array of convex lenses provided in parallel to the plurality of light-emitting element groups and intervening along the plurality of optical paths between the first array of convex lenses and the plurality of optical path switching members, wherein each convex lens of the second array of convex lenses is aligned with a respective light-emitting element group;

one or more movable members, wherein each of the one or more movable members is structurally connected to one or more convex lenses and is capable of changing a position of the connected one or more convex lenses in a direction along the plurality of optical paths;

a third array of convex lenses provided in parallel to the plurality of light-receiving element groups and intervening along the plurality of optical paths between the plurality of light-receiving element groups and the plurality of optical path switching members, wherein each convex lens of the third array of convex lenses is aligned with a respective light-receiving element group; and a fourth array of convex lenses provided in parallel to the plurality of light-receiving element groups and intervening along the plurality of optical paths between the plurality of light-receiving element groups and the third array of convex lenses, wherein each convex lens of the fourth array of convex lenses is aligned with a respective light-receiving element group.

8. The optical interconnect device according to claim 7, wherein:

the one or more movable members include a first unified movable member that is structurally connected to each convex lens of the first array of convex lenses such that the first unified movable member is capable of changing, in unison, a position of each convex lens of the first array of convex lenses in a direction extending from the plurality of light-emitting element groups to the second array of convex lenses; and the one or more movable members include a second unified movable member that is structurally connected to each convex lens of the fourth array of convex lenses such that the second unified movable member is capable of changing, in unison, a position of each convex lens of the fourth array of convex lenses in a direction extending from the plurality of light-receiving element groups to the third array of convex lenses.

9. The optical interconnect device according to claim 7, wherein:

the one or more movable members include a plurality of first movable members, each first movable member structurally connected to a single respective convex lens of the first array of convex lenses such that each first movable member is capable of changing a position of the respective convex lens of the first array of convex lenses in a direction extending from the plurality of light-emitting element groups to the second array of convex lenses; and the one or more movable members include a plurality of second movable members, each second movable member structurally connect to a single respective convex lens of the fourth array of convex lenses such that each second movable member is capable of changing a position of the respective convex lens of the fourth array of convex lenses in a direction extending from the plurality of light-receiving element groups to the third array of convex lenses.

10. The optical interconnect device according to claim 9, wherein:

the one or more movable members include a first unified movable member that is structurally connected to each convex lens of the first array of convex lenses such that the first unified movable member is capable of changing, in unison, a position of each convex lens in the first array of convex lenses in a direction extending from the plurality of light-emitting element groups to the second array of convex lenses; and the one or more movable members include a second unified movable member that is structurally connected to each convex lens of the fourth array of convex lenses such that the second unified movable member is capable of changing, in unison, a position of each convex lens of the fourth array of convex lenses in a direction extending from the plurality of light-receiving element groups to the third array of convex lenses.

11. The optical interconnect device according to claim 10, further comprising:
a first transparent plate on which each convex lens of the first array of convex lenses is mounted and to which the first unified movable member is structurally connected; and
a second transparent plate on which each convex lens of the fourth array of convex lenses is mounted and to which the second unified movable member is structurally connected.

12. The optical interconnect device according to claim 7, wherein the first array of convex lenses and the fourth array of convex lenses are coplanar and the second array of convex lenses and the third array of convex lenses are coplanar.

13. The optical interconnect device according to claim 12, further comprising:
a second plurality of optical path switching members disposed along the plurality of optical paths and intervening along the plurality of optical paths in between the first plurality of optical path switching members and the third array of convex lenses, wherein:
each second optical path switching member is connected to a respective optical path switching mechanism that adjusts an orientation of the connected second optical path switching member to selectively direct a light beam along an optical path of the plurality of optical paths that is selected from among optical paths that correspond to a light-receiving element group that is aligned with the connected second optical path switching member; and
the first plurality of optical path switching members and the second plurality of optical path switching members are arranged in peaked-roof configuration.

14. The optical interconnect device according to claim 13, wherein each optical path switching member of the first plurality of optical path switching members and the second plurality of optical path switching members is a flat mirror.

15. The optical interconnect device according to claim 14, wherein:
each light-emitting element of the plurality of light-emitting elements of the plurality of light-emitting element groups has a light-emitting element side-length;
each light-receiving element of the plurality of light-receiving elements of the plurality of light-receiving element groups has a light-receiving element side-length; and
the light-emitting element side-length is at least twenty times the light-receiving element side-length.

16. The optical interconnect device according to claim 15, wherein each convex lens of the first array of convex lenses and the fourth array of convex lenses has a first lens diameter that is greater than a diameter of each light-emitting group and a diameter of each light-receiving element group.

17. The optical interconnect device according to claim 16, wherein:
each convex lens of the second array of convex lenses and third array of convex lenses has a second lens diameter that is greater than the first lens diameter; and
each optical path switching member of the first plurality of optical path switching members and the second plurality of optical path switching members is a square mirror having a mirror side-length that is equal to the second lens diameter.

18. The optical interconnect device according to claim 15, wherein:
a light-emitting element count identifies a count of light-emitting elements included in each plurality of light-emitting elements of the plurality of light-emitting element groups;
a light-receiving elements count identifies a count of light-receiving elements included in each plurality of light-receiving elements of the plurality of light-receiving element groups; and
the light-receiving element count is greater than the light-emitting element count.

19. The optical interconnect device according to claim 12, wherein:
first array of convex lenses and the fourth array of convex are provided together as a composite array of convex lenses; and
the one or more movable members include a composite-array movable member that is structurally connected to the composite array of convex lenses such that the composite-array movable member is capable of changing, in unison, a position of each convex lens in the first array of convex lenses and the fourth array of convex lenses in a direction extending from the plurality of light-emitting element groups and the plurality of light-receiving element groups to the second array of convex lenses and the third array of convex lenses.

* * * * *